Patented Oct. 23, 1951

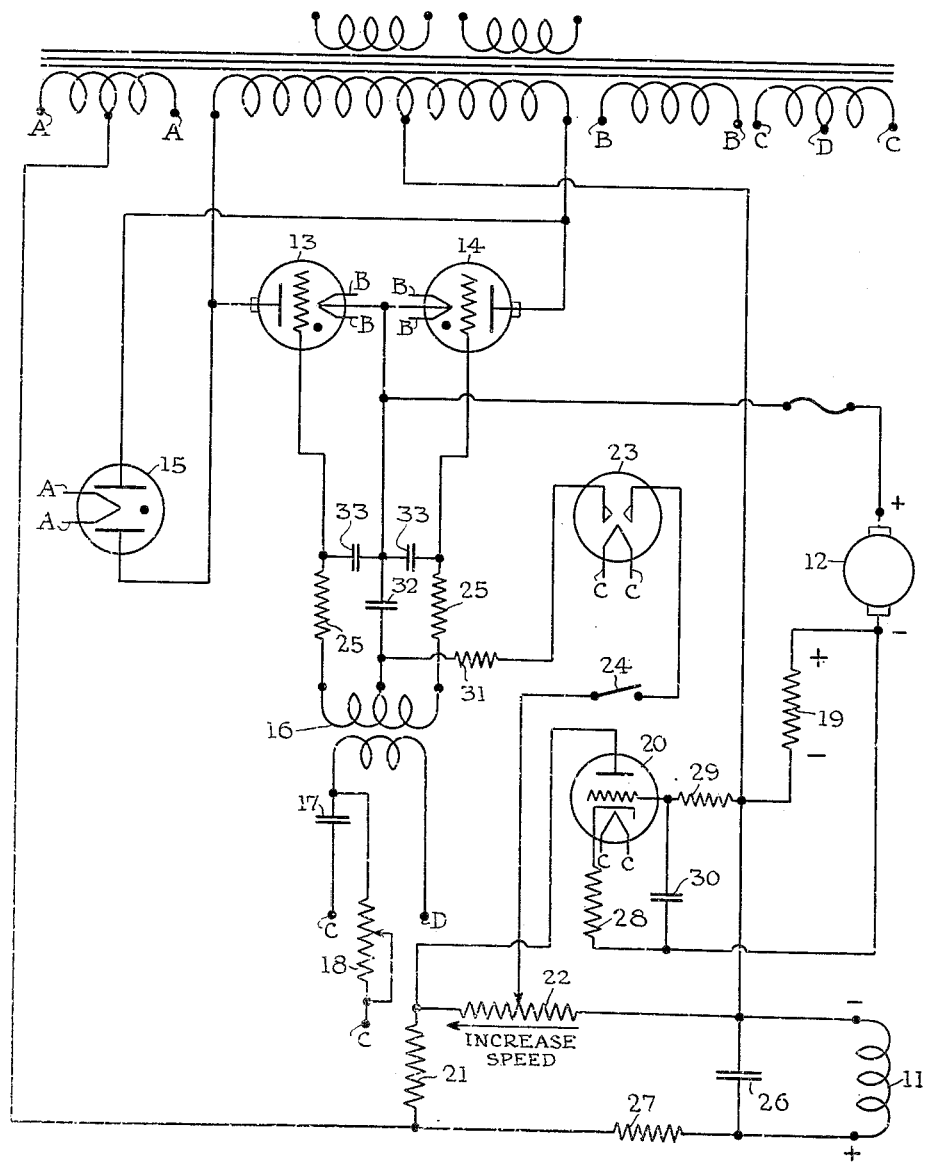

2,572,824

UNITED STATES PATENT OFFICE 2,572,824

ELECTRONIC MOTOR SPEED CONTROL

Floyd V. Wilkins, Paterson, N. J., assignor to Servo-Tek Products Co., Inc., Paterson, N. J., a corporation of New Jersey Application February 8, 1949, Serial No. 75,230

6 Claims. (Cl. 318—332)

1

This invention relates to motor regulating systems and more particularly to electronic regulating systems of the type adapted to control a direct current motor running from an alternating current source.

It has been long recognized that direct current motors lend themselves more readily to accurate control than do alternating current motors. Since most commercially electrical power is now A. C., it has become the practice where accurate control of motor characteristics is desired, to operate direct current motors from an A. C. source of supply through the intermediary of rectifier circuits. Although many types of rectifiers could be used, the gaseous tube is currently in favor because of its ability to handle large current values. The thyratron type rectifier is widely used because in addition to its high current carrying capacity, it can be accurately controlled by the application of various combinations of direct and alternating current voltage on its grids. All this is well known and a detailed explanation of thyratron theory is not believed necessary in this application.

Equipment for motor controls of this type are generally bulky, expensive and complicated to the extent that maintenance and repair are oftentimes difficult.

It is the object of this invention to provide a control system of the type described which will furnish accurate, sensitive and dependable automatic control over a wide range of speed variation and from no load to full load conditions.

It is a further object to accomplish this result with a minimum of equipment, bulk and expense.

My invention will be best understood by the following description in connection with the accompanying drawing which shows a diagrammatic circuit of a preferred embodiment thereof.

The motor may be an ordinary direct current motor. The drawing shows a shunt type motor having a field winding 11 and armature 12. It should be understood, however, that other common types of D. C. motors may be easily adapted to the type of control herein disclosed.

Tubes 13 and 14 are thyratrons connected to supply the armature 12 with D. C. voltage from an A. C. source as shown. Tube 15 is a full wave rectifier connected to provide a reference voltage for the control circuit. As shown in the drawing, use is made of this reference voltage to provide a separate source of exitation for the field winding 11 of the motor.

Transformer 16 is connected to supply an A. C. bias voltage to the grids of tubes 13 and 14. This

2 voltage may be displaced approximately 90° from the anode voltage by means of the phase shifting network consisting of a condenser 17 and a variable resistor 18 connected in primary winding of the transformer.

It is known to superimpose on the A. C. grid voltage a D. C. voltage in order to vary the firing time of a thyratron tube. This principle is thoroughly described in the U. S. patent to Edwards 1,986,627. My invention makes use of this principle in a control circuit for a direct current motor in a new and simple fashion as follows:

Resistor 19 is placed in series with the armature of the motor and the thyratron tubes. The end of this resistor remote from the armature is connected to the negative side of the power source, which is the center tap of the power supply transformer. Since the current supplied to the armature must also flow in this resistor, the voltage appearing across the resistor will always be directly proportional to the armature current, and, therefore, to the load on the motor.

Omitting, for the moment, the part played by tube 20 and its associated circuits, the voltage appearing across armature 12, resistor 19, and resistors 21 and 22 is connected to the center tap of the secondary winding of transformer 16. Since the voltage appearing across armature 12 and resistor 19 is of opposite polarity to that appearing across resistors 21 and 22, the voltage supplied to the center tap of the secondary winding of tranformer 16 will be of a magnitude equal to the difference in their values. Depending on the setting of resistor 22, nearly all of this D. C. voltage is superimposed on the A. C. voltage supplied to the grids of the thyratrons by transformer 16.

Since the adjustment of resistor 22 varies the amount of this superimposed voltage, it, therefore, controls the time in each cycle in which rectified current can flow. This rectified output of the thyratrons is connected to the armature of the motor, and since the field supply, which also is acting as a reference voltage is virtually constant, the speed of the motor can be set at a desired value by adjustment of resistor 22.

This circuit produces a regulating effect which is due to the fact that the work load imposed on the motor, with its consequent increase in armature current, tends to cause a drop in the voltage appearing across the armature. With the negative side of this voltage connected to the negative side of the field, or reference voltage, it will be seen that a decrease in armature voltage will cause a more positive voltage to appear between grid and cathode (in this case filament) of the thyratrons. This change in grid potential in a positive direction advances the firing time of the thyratrons and thus restores the output voltage to very nearly its original value. Resistor 19, being of a low value of resistance as compared to the motor armature, has negligible effect in this action but plays an important part to be later described. The portion of the control circuit just described will maintain reasonably constant armature voltages over motor load conditions varying from 0 to full-rated values. This succeeds in maintaining nearly a constant speed but only in the lower speed ranges, when the armature voltages are of a consequent low value.

In order to maintain constant higher speeds over varying load conditions, it is necessary to actually increase the voltage applied to the armature, rather than maintain it constant. For this purpose an electronic amplifier shown consisting of vacuum tube 20 is connected with its grid input circuit across the previously mentioned resistor 19. The load resistor 21 is connected in the plate circuit of tube 20 together with the variable resistor 22. The operation of this circuit is as follows:

Assume the motor to be running at its rated speed and with no load and then apply a load to the motor. The application of load will tend to slow the motor down and consequently its back E. M. F. will drop, and the armature current will increase. An increase in armature current will cause a corresponding increase in the voltage drop across resistor 19. This causes a more negative grid bias on tube 20, a decrease in plate current, and a corresponding decrease in the voltage drop across resistor 21. With this decrease in voltage drop the voltage across resistor 22 is increased, and since under this condition the variable arm of resistor 22 is set for maximum voltage, or full speed, this entire increase in voltage will be passed to the grids of the thyratrons through transformer 16 and its associated components. This increase in voltage (or a lesser negative voltage, depending upon the tubes used) causes an advance in the firing angle of the thyratrons. The thyratrons thus respond to the increase in load on the motor by conducting current through a greater portion of each cycle of the applied A. C. voltage and, therefore, supply a higher voltage to the armature of the motor.

With the resistor 22 set for minimum motor speed (extreme right hand position in the drawing) tube 20 is effectively removed from the circuit. Speed regulation remains good, however, because the previously mentioned series circuit embodying the armature and the resistors across a constant D. C. source have the effect of changing the firing time of the thyratrons to the extent of maintaining nearly constant voltage. As more of resistor 22 is put in the circuit the additional regulating effect of tube 20 increases and is at a maximum when the setting is for rated motor speed, i. e., with all of the resistor 22 in the circuit. The net result is nearly perfect automatic regulation of motor speed from no load to full load regardless of the speed setting of the motor. This characteristic is a highly desirable one for a wide variety of industrial application. The basic control circuit herein disclosed can be easily adapted to use with series or compound wound D. C. motors. In the case of a series motor, the reference voltage, of course, would not be used to separately excite the field winding.

The above description covers the basic operation of the control circuit. 23 is a thermal relay which prevents application of the control voltage to the thyratrons for a short time following initial application of A. C. power to the control circuit. This permits the filaments of the thyratron to reach a safe operating temperature, and, therefore, prolongs tube life. Switch 24 starts and stops the motor by interrupting the application of the regulating voltage, and is placed in the circuit as an added convenience to the operator. Since it handles only extremely small currents, the leads may be long and it may be placed at any convenient point even if remote from the motor and regulator system components.

Resistors 25 in the grid circuits of the thyratrons serve as current limiters in the event that the grids should become positive with respect to the filaments.

Condenser 26 across the field winding 11 of the motor and resistor 27 in series with the field supply, constitute a filter which helps to maintain the voltage constant across the field. Similar filter action is provided for the input to tube 20 by resistor 29 and condenser 30, and to the thyratrons by resistor 31, and condensers 32 and 33.

It will be obvious that this circuit is clearly adaptable to rectifiers of the half wave type, as well as other variations in circuit elements and tube types, and such changes obvious to one skilled in the art, are certainly within the scope of the present invention. However, I have obtained good results when operating a ½ H. P. motor by using C3J thyratrons, field supply rectifier type 83 and control tube type 6J5. The more important elements of the control circuit associated with tube 20 and with which I have obtained good results are: resistor 19—3 ohms, resistor 20—1.8 k. ohms, resistor 21—18 k. ohms, and variable resistor 22—1 megohm. The more important elements of the thyratron grid circuit with which I have obtained good results are: resistor 25—220 k. ohms, condenser 33—.002 microfarad, and condenser 32—.02 microfarad.

In the event that a motor larger than ½ horsepower is to be used, it may be advantageous to make use of a second control tube or a single duotriode such as a 6SN7 to provide two stages of amplification for the voltage developed across resistor 19.

I claim:

1. A circuit for controlling the operation of a direct current motor from an alternating current source, comprising in combination: grid-controlled gaseous rectifier means connected to supply D. C. voltage to the armature of said motor from said A. C. source; means including a rectifier and a load impedance therefor connected to supply a D. C. reference potential from said source in series opposition to said armature supply; means for supplying the grid of said gaseous rectifier means with an A. C. voltage out-of-phase with said source; means to superimpose on the grid of said gaseous rectifier means the difference between said armature supply voltage and said D. C. reference potential; a resistive circuit element connected in series with said armature and said gaseous rectifier means; at least one electronic amplifier tube, which includes a cathode, an input control grid and an output anode; means connecting the input control grid of said electronic amplifier across said resistive circuit element so that an increase in armature current causes a decrease in the anode current of said tube; a second resistive circuit element connected in the output anode circuit of said electronic amplifier; means connecting the grid of said gaseous rectifier means to said second resistive circuit element; and means to energize the field winding of said motor.

2. A circuit for controlling the operation of a direct current motor from an alternating current source, comprising in combination: grid-controlled gaseous rectifier means connected to supply D. C. voltage to said motor from said source; means for supplying the grid of said gaseous rectifier means with an A. C. voltage out-of-phase with said source; means including a rectifier and a load impedance therefor connected to supply a D. C. reference potential from said source in series opposition to said armature supply; means to superimpose on the grid of said gaseous rectifier means the difference between said motor supply voltage and said D. C. reference potential; a resistive circuit element connected in series with said motor and said gaseous rectifier means; at least one electronic amplifier tube which includes a cathode, an input control grid and an output anode; means connecting the input control grid of said electronic amplifier across said resistive circuit element so that an increase in motor current causes a decrease in anode current of the tube; a second resistive circuit element connected in the output anode circuit of said electronic amplifier; and means connecting the grid of said gaseous rectifier means to said second resistive circuit element.

3. In combination: a D. C. motor of the shunt type, having an armature winding and a field winding; a source of A. C. power; a full wave thyratron rectifier circuit connected intermediate said power source and said armature to supply D. C. voltage thereto; means including a transformer and a phase shifting network connected intermediate said power source and the control grids of said thyratrons; a second rectifier and a load impedance therefor connected intermediate said A. C. source and said armature to furnish a D. C. reference potential in series opposition to said armature voltage; means to superimpose on the grids of said thyratrons the difference between said armature voltage and said D. C. reference potential; a vacuum tube amplifier having at least an anode, a cathode and a control grid; means connected intermediate said power source and said tube for supplying the anode thereof with D. C. voltage; output means for said tube including a resistive network connected intermediate the grids of said thyratrons and the anode of said tube; a resistor connected intermediate said thyratrons and said armature; and input means for said tube, connected across said resistor so that an increase in armature current causes a decrease in anode current of said tube.

4. In a control circuit as defined by claim 1, a resistive network in the anode circuit of said discharge tube, including a variable resistor connected intermediate the grid of said gaseous rectifier means and said anode circuit whereby the speed of the motor may be adjusted irrespective of load on the motor.

5. A circuit for controlling the operation of a direct current motor from an alternating current source comprising in combination: grid controlled gaseous rectifier means connected to supply D. C. voltage to the armature of the motor from the A. C. source; a first resistor connected in series between the armature of said motor and the negative side of said gaseous rectifier means; means for supplying the grid of said gaseous rectifier means with an A. C. voltage which voltage is out of phase with said source; an electronic tube including a cathode, an anode and a control grid; means connecting the grid circuit of said tube to said first resistor so that an increase in armature current causes a decrease in the anode current of said tube; means to supply direct current to the anode of said tube and the field winding of said motor from the A. C. source; a second resistor connected in series with said anode, and the positive side of the anode supply; a third resistor connected in series with the anode and the negative side of said anode supply; and means connecting the grid of said gaseous rectifier means to an intermediate point of said third resistor.

6. A circuit for controlling the operation of a direct current motor from an alternating current source comprising in combination: grid controlled gaseous rectifier means connected to supply D. C. voltage to the armature of the motor from the A. C. source; a first resistor connected in series between the armature of said motor and the negative side of said gaseous rectifier means; means including a variable phase shifter to supply the grid of said gaseous rectifier means with an A. C. voltage out of phase with said source; means for supplying the grid of said gaseous rectifier means with a variable D. C. reference potential connected in series opposition to the armature supply voltage and so arranged that an increase in said potential advances the firing time of said gaseous rectifier means; an electronic tube including a cathode, an anode and a control grid; means connecting the grid circuit of said tube to said first resistor so that an increase in armature current causes a decrease in the anode current of said tube; means to supply direct current to the anode of said tube and the field winding of the motor from the A. C. source; a second resistor connected in series with said anode and said D. C. reference potential; a third resistor connected in series with the anode and the negative side of said anode supply; and means connecting the grid of said gaseous rectifier means to an intermediate point of said third resistor whereby an increase in armature current causes an increase in the reference D. C. voltage which thus restores the armature voltage to a new value to compensate for increased IR drop caused by the increased load on motor.

FLOYD V. WILKINS.

REFERENCES CITED

The following references are of record in the file of this patent:

UNITED STATES PATENTS

| Number | Name | Date |
|---|---|---|
| 2,422,567 | Puchlowski | June 17, 1947 |